US010807248B2

(12) United States Patent
Neff et al.

(10) Patent No.: US 10,807,248 B2
(45) Date of Patent: Oct. 20, 2020

(54) DIRECT DRIVE BRUSHLESS MOTOR FOR ROBOTIC FINGER

(71) Applicant: Systems, Machines, Automation Components Corporation, Carlsbad, CA (US)

(72) Inventors: Edward A. Neff, Cardiff-by-the-Sea, CA (US); Toan M. Vu, San Diego, CA (US); David D. Huang, Carlsbad, CA (US); Naoyuki Okada, San Diego, CA (US); Andrew Gladoch, San Marcos, CA (US)

(73) Assignee: Systems, Machines, Automation Components Corporation, Carlsbad, CA (US)

( * ) Notice: Subject to any disclaimer, the term of this patent is extended or adjusted under 35 U.S.C. 154(b) by 0 days.

(21) Appl. No.: 15/712,047

(22) Filed: Sep. 21, 2017

(65) Prior Publication Data

US 2018/0071921 A1 Mar. 15, 2018

Related U.S. Application Data

(63) Continuation-in-part of application No. 14/611,113, filed on Jan. 30, 2015, now Pat. No. 9,871,435.
(Continued)

(51) Int. Cl.
*B25J 15/00* (2006.01)
*B25J 3/04* (2006.01)
(Continued)

(52) U.S. Cl.
CPC ............ *B25J 15/0009* (2013.01); *B25J 3/04* (2013.01); *B25J 9/126* (2013.01); *B25J 19/063* (2013.01);
(Continued)

(58) Field of Classification Search
CPC ...... B25J 15/0009; B25J 19/063; B25J 9/126; B25J 3/04; H02K 26/00; H02K 21/222;
(Continued)

(56) References Cited

U.S. PATENT DOCUMENTS 3,152,275 A * 10/1964 Aske ..................... G08C 19/38
310/266
3,602,749 A 8/1971 Esters
(Continued)

FOREIGN PATENT DOCUMENTS

DE 2217958 A1 10/1973
EP 0556469 A1 8/1993
(Continued)

OTHER PUBLICATIONS

International Search Report and Written Opinion for International Application No. PCT/US2018/012223, dated Apr. 24, 2018, 9 pages.
(Continued)

*Primary Examiner* — John K Kim
(74) *Attorney, Agent, or Firm* — Cooley LLP

(57) ABSTRACT

A direct drive brushless motor including a plurality of rotational components and a plurality of non-rotational components. Ones of the pluralities of rotational and non-rotational components form a dual magnetic circuit. The plurality of rotational components includes a center rotation shaft circumscribed by a plurality of coils and a coil termination plate configured to support the plurality of coils. The plurality of non-rotational components includes a plurality of outer magnets arranged around the plurality of coils in a Halbach configuration and a plurality of inner magnets arranged in a Halbach configuration between the coils and
(Continued)

the shaft. A flex cable having one or more leads provides electrical current to the plurality of coils without the use of brushes.

21 Claims, 11 Drawing Sheets

Related U.S. Application Data

(60) Provisional application No. 62/441,913, filed on Jan. 3, 2017, provisional application No. 61/934,628, filed on Jan. 31, 2014.

(51) Int. Cl.

| | | |
|---|---|---|
| *H02K 11/21* | (2016.01) | |
| *H02K 21/04* | (2006.01) | |
| *H02K 41/035* | (2006.01) | |
| *B25J 9/12* | (2006.01) | |
| *H02K 21/22* | (2006.01) | |
| *H02K 26/00* | (2006.01) | |
| *B25J 19/06* | (2006.01) | |
| *H02K 1/17* | (2006.01) | |

(52) U.S. Cl.
CPC ............... *H02K 1/17* (2013.01); *H02K 11/21* (2016.01); *H02K 21/046* (2013.01); *H02K 21/222* (2013.01); *H02K 26/00* (2013.01); *H02K 41/0358* (2013.01)

(58) Field of Classification Search
CPC ...... H02K 41/0358; H02K 11/21; H02K 1/17; H02K 21/046
USPC .............................................. 310/36, 156.12
See application file for complete search history.

(56) References Cited

U.S. PATENT DOCUMENTS

| | | | |
|---|---|---|---|
| 3,734,332 A | 5/1973 | Grulich | |
| 4,398,167 A * | 8/1983 | Dickie | H02K 33/18 310/266 |
| 4,488,242 A | 12/1984 | Tabata et al. | |
| 4,576,421 A | 3/1986 | Teramachi | |
| 4,616,886 A | 10/1986 | Teramachi | |
| 4,677,375 A | 6/1987 | Nakaie et al. | |
| 4,693,676 A | 9/1987 | Inaba | |
| 4,696,144 A | 9/1987 | Bankuty et al. | |
| 4,745,589 A | 5/1988 | Nomura | |
| 4,799,803 A | 1/1989 | Tanaka | |
| 4,804,913 A | 2/1989 | Shimizu et al. | |
| 4,808,955 A | 2/1989 | Godkin et al. | |
| 4,857,786 A | 8/1989 | Nihei et al. | |
| 4,858,452 A | 8/1989 | Ibrahim | |
| 5,051,635 A | 9/1991 | Kasahara | |
| 5,053,670 A | 10/1991 | Kosugi | |
| 5,057,753 A | 10/1991 | Leuthold et al. | |
| 5,111,088 A | 5/1992 | Fujino | |
| 5,115,617 A | 5/1992 | Lewis et al. | |
| 5,160,865 A | 11/1992 | Gururangan | |
| 5,161,586 A | 11/1992 | Auriemma | |
| 5,175,456 A | 12/1992 | Neff et al. | |
| 5,201,838 A | 4/1993 | Roudaut | |
| 5,212,862 A | 5/1993 | Eshghy | |
| 5,225,725 A | 7/1993 | Shiraki et al. | |
| 5,270,625 A | 12/1993 | Neff | |
| 5,317,222 A | 5/1994 | Neff et al. | |
| 5,349,543 A | 9/1994 | Buliszyn et al. | |
| 5,376,862 A | 12/1994 | Stevens | |
| 5,446,323 A | 8/1995 | Neff et al. | |
| 5,450,050 A | 9/1995 | Ban et al. | |
| 5,476,324 A | 12/1995 | Takei | |
| 5,501,498 A | 3/1996 | Ulrich | |
| 5,594,309 A | 1/1997 | McConnell et al. | |
| 5,685,214 A * | 11/1997 | Neff | B23Q 1/4876 310/12.13 |
| 5,722,300 A | 3/1998 | Burkhard et al. | |
| 5,751,075 A | 5/1998 | Kwon et al. | |
| 5,751,077 A | 5/1998 | Gonzalez | |
| 5,834,872 A | 11/1998 | Lamb | |
| 5,859,482 A | 1/1999 | Crowell et al. | |
| 5,893,646 A | 4/1999 | Mizutani et al. | |
| 5,952,589 A | 9/1999 | Leung et al. | |
| 6,004,029 A | 12/1999 | Moslehi et al. | |
| 6,021,555 A | 2/2000 | Leong | |
| 6,043,573 A | 3/2000 | Neff et al. | |
| 6,073,505 A | 6/2000 | Yuda | |
| 6,091,167 A | 7/2000 | Vu et al. | |
| 6,105,343 A | 8/2000 | Grove et al. | |
| 6,116,139 A | 9/2000 | Yuda et al. | |
| 6,118,360 A | 9/2000 | Neff | |
| 6,223,971 B1 | 5/2001 | Sato | |
| 6,227,703 B1 | 5/2001 | DiMatteo | |
| 6,290,308 B1 | 9/2001 | Zitzelsberger | |
| 6,404,086 B1 | 6/2002 | Fukasaku et al. | |
| 6,439,103 B1 | 8/2002 | Miller | |
| 6,494,611 B2 | 12/2002 | Edwards et al. | |
| 6,495,935 B1 | 12/2002 | Mishler | |
| 6,525,439 B2 | 2/2003 | Whelan et al. | |
| 6,741,151 B1 | 5/2004 | Livshitz et al. | |
| 6,792,657 B2 | 9/2004 | Reid et al. | |
| 6,848,164 B2 | 2/2005 | Jung | |
| 6,907,651 B1 | 6/2005 | Fisher et al. | |
| 6,997,077 B2 | 2/2006 | Kollmann et al. | |
| 7,011,117 B1 | 3/2006 | Carpino et al. | |
| 7,053,583 B1 | 5/2006 | Hazelton | |
| 7,168,748 B2 | 1/2007 | Townsend et al. | |
| 7,323,798 B2 | 1/2008 | Hartramph et al. | |
| 7,336,007 B2 | 2/2008 | Chitayat | |
| 7,482,717 B2 * | 1/2009 | Hochhalter | H02K 7/06 310/12.14 |
| 7,517,721 B2 | 4/2009 | Ito et al. | |
| 7,800,470 B2 | 9/2010 | Wright et al. | |
| 7,960,893 B2 | 6/2011 | Kim et al. | |
| 8,083,278 B2 | 12/2011 | Yuan | |
| 8,415,838 B1 | 4/2013 | Eghbal et al. | |
| 8,487,484 B1 | 7/2013 | Miller, Jr. et al. | |
| 8,498,741 B2 | 7/2013 | Ihrke et al. | |
| 8,578,760 B2 | 11/2013 | Calhoun et al. | |
| 8,890,389 B2 | 11/2014 | Li et al. | |
| 8,915,047 B2 | 12/2014 | Wilhelm et al. | |
| 9,375,848 B2 | 6/2016 | Neff et al. | |
| 9,381,649 B2 * | 7/2016 | Neff | B25J 15/0206 |
| 9,731,418 B2 | 8/2017 | Neff et al. | |
| 9,748,823 B2 | 8/2017 | Neff et al. | |
| 9,748,824 B2 | 8/2017 | Neff et al. | |
| 9,780,634 B2 | 10/2017 | Neff et al. | |
| 9,871,435 B2 | 1/2018 | Neff et al. | |
| 9,887,612 B1 | 2/2018 | Eghbal | |
| 10,005,187 B2 | 6/2018 | Neff et al. | |
| 10,205,355 B2 | 2/2019 | Neff et al. | |
| 10,215,802 B2 | 2/2019 | Neff et al. | |
| 10,429,211 B2 | 10/2019 | Neff et al. | |
| 2001/0013728 A1 | 8/2001 | Harita et al. | |
| 2002/0148205 A1 | 10/2002 | Takebe et al. | |
| 2002/0166221 A1 | 11/2002 | Clew | |
| 2003/0009241 A1 | 1/2003 | Kruger et al. | |
| 2003/0218391 A1 | 11/2003 | Hirata | |
| 2004/0076348 A1 | 4/2004 | Dalessandro et al. | |
| 2004/0227535 A1 | 11/2004 | Kobayashi et al. | |
| 2004/0232800 A1 | 11/2004 | Seguchi et al. | |
| 2004/0237679 A1 | 12/2004 | Enright | |
| 2005/0211512 A1 | 9/2005 | Fenwick | |
| 2005/0234565 A1 | 10/2005 | Marks et al. | |
| 2005/0253469 A1 | 11/2005 | Hochhalter et al. | |
| 2005/0258701 A1 | 11/2005 | Soitu | |
| 2006/0023980 A1 | 2/2006 | Kato et al. | |
| 2006/0113847 A1 | 6/2006 | Randall et al. | |
| 2006/0242929 A1 | 11/2006 | Servadei et al. | |
| 2006/0279140 A1 | 12/2006 | Jenny | |
| 2007/0047050 A1 | 3/2007 | Masahiko et al. | |
| 2007/0053781 A1 | 3/2007 | Davis | |

(56) References Cited

U.S. PATENT DOCUMENTS

| | | |
|---|---|---|
| 2007/0107801 A1 | 5/2007 | Cochran et al. |
| 2007/0296364 A1 | 12/2007 | Shoemaker et al. |
| 2008/0048505 A1 | 2/2008 | Moriyama et al. |
| 2008/0150559 A1 | 6/2008 | Nayak et al. |
| 2008/0157607 A1 | 7/2008 | Scheich et al. |
| 2008/0258654 A1 | 10/2008 | Neff |
| 2009/0013642 A1 | 1/2009 | Yuyama et al. |
| 2009/0040247 A1 | 2/2009 | Cato et al. |
| 2009/0058198 A1 | 3/2009 | Finkbeiner et al. |
| 2009/0058201 A1 | 3/2009 | Brennvall |
| 2009/0058581 A1 | 3/2009 | Neff et al. |
| 2009/0114052 A1 | 5/2009 | Haniya et al. |
| 2009/0152960 A1 | 6/2009 | Kimura et al. |
| 2009/0218894 A1 | 9/2009 | Aso et al. |
| 2009/0261663 A1 | 10/2009 | Aso et al. |
| 2009/0278412 A1 | 11/2009 | Kimura et al. |
| 2009/0302798 A1 | 12/2009 | Wei |
| 2009/0309442 A1 | 12/2009 | Qu et al. |
| 2010/0005918 A1 | 1/2010 | Mizuno et al. |
| 2010/0101192 A1 | 4/2010 | Krevald |
| 2010/0133924 A1 | 6/2010 | Neff et al. |
| 2010/0171378 A1 | 7/2010 | Kim et al. |
| 2010/0181858 A1 | 7/2010 | Hibbs et al. |
| 2010/0203249 A1 | 8/2010 | Elgimiabi |
| 2010/0244605 A1 | 9/2010 | Nakano et al. |
| 2010/0274365 A1* | 10/2010 | Evans ............... A61F 2/585 623/57 |
| 2010/0295401 A1 | 11/2010 | Nakagawa et al. |
| 2011/0037333 A1 | 2/2011 | Atallah et al. |
| 2011/0068595 A1 | 3/2011 | Ihrke et al. |
| 2011/0083405 A1 | 4/2011 | Dewert et al. |
| 2011/0132169 A1 | 6/2011 | Kapoor et al. |
| 2011/0187222 A1 | 8/2011 | Li et al. |
| 2011/0210636 A1 | 9/2011 | Kuhlmann-Wilsdorf |
| 2012/0043832 A1 | 2/2012 | Neff et al. |
| 2012/0080960 A1 | 4/2012 | Neff et al. |
| 2012/0187779 A1 | 7/2012 | Lee |
| 2012/0206024 A1 | 8/2012 | Yoshida et al. |
| 2012/0299405 A1 | 11/2012 | Li et al. |
| 2012/0305092 A1 | 12/2012 | Corso et al. |
| 2013/0093276 A1 | 4/2013 | Kim |
| 2013/0154397 A1 | 6/2013 | Sullivan |
| 2014/0159407 A1 | 6/2014 | Neff et al. |
| 2014/0159408 A1 | 6/2014 | Neff et al. |
| 2014/0159513 A1 | 6/2014 | Neff et al. |
| 2014/0159514 A1 | 6/2014 | Neff et al. |
| 2014/0210396 A1 | 7/2014 | Yamanaka et al. |
| 2014/0317941 A1 | 10/2014 | Patti et al. |
| 2014/0333241 A1* | 11/2014 | Zhao ............... H02P 21/24 318/400.02 |
| 2015/0048695 A1 | 2/2015 | Stoltenberg et al. |
| 2015/0168483 A1 | 6/2015 | Kim |
| 2015/0171723 A1 | 6/2015 | Neff et al. |
| 2015/0236575 A1* | 8/2015 | Walsh ............... H02K 21/46 310/156.07 |
| 2015/0279539 A1 | 10/2015 | Blanding et al. |
| 2015/0303785 A1* | 10/2015 | Neff ............... H02K 21/046 310/38 |
| 2016/0013712 A1 | 1/2016 | Neff et al. |
| 2016/0184989 A1 | 6/2016 | Neff et al. |
| 2016/0229064 A1 | 8/2016 | Neff et al. |
| 2017/0012519 A1 | 1/2017 | Neff et al. |
| 2017/0014964 A1 | 1/2017 | Neff |
| 2017/0089976 A1 | 3/2017 | Neff et al. |
| 2018/0071921 A1* | 3/2018 | Neff ............... H02K 41/0358 |
| 2018/0191210 A1 | 7/2018 | Neff et al. |

FOREIGN PATENT DOCUMENTS

| | | |
|---|---|---|
| EP | 1278109 | 1/2003 |
| EP | 1827073 | 8/2007 |
| GB | 645281 A | 10/1950 |
| JP | 61-116964 A2 | 6/1986 |
| JP | 04-181562 | 6/1992 |
| JP | 03285554 A | 12/1992 |
| JP | 5-23994 | 2/1993 |
| JP | 06-054497 | 2/1994 |
| JP | 06-245446 | 9/1994 |
| JP | 06-260332 | 9/1994 |
| JP | 07-015942 | 1/1995 |
| JP | 07-131967 A | 5/1995 |
| JP | H09-214187 | 8/1997 |
| JP | 10-329081 | 12/1998 |
| JP | 2000-152592 A | 5/2000 |
| JP | 2001-238427 A | 8/2001 |
| JP | 2001-286121 A2 | 10/2001 |
| JP | 2002-176292 | 6/2002 |
| JP | 2004-332935 | 11/2004 |
| JP | 2005-020901 A | 1/2005 |
| JP | 2005-080415 | 3/2005 |
| JP | 2008-048556 A | 2/2008 |
| JP | 2008-155302 A2 | 7/2008 |
| JP | 2008-193845 A2 | 8/2008 |
| JP | 2010-178614 A | 8/2010 |
| JP | 52-22705 | 6/2013 |
| JP | 2013-126334 | 6/2013 |
| KR | 10-2008-0090040 | 10/2008 |
| KR | 20-2011-0003488 | 4/2011 |
| KR | 10-2011-0139434 | 12/2011 |
| WO | WO 2007/026566 A1 | 3/2007 |
| WO | WO 2007/063729 A1 | 6/2007 |
| WO | WO 2008/081685 | 7/2008 |
| WO | WO 2009/116343 A1 | 9/2009 |
| WO | WO 2009/117827 | 10/2009 |
| WO | WO 2011/088964 A1 | 7/2011 |
| WO | WO 2013/099008 | 7/2013 |
| WO | WO 2014/076809 | 5/2014 |
| WO | WO 2015/117095 | 8/2015 |
| WO | WO 2015/154026 | 10/2015 |

OTHER PUBLICATIONS

International Search Report and Written Opinion for International Application No. PCT/US2013/047727, dated Oct. 16, 2013, 7 pages.
International Preliminary Report on Patentability for International Application No. PCT/US2013/047727, dated Dec. 31, 2014, 5 pages.
International Search Report and Written Opinion for International Application No. PCT/US2013/047728, dated Oct. 16, 2013, 9 pages.
International Preliminary Report on Patentability for International Application No. PCT/US2013/047728, dated Dec. 31, 2014, 7 pages.
International Search Report and Written Opinion for International Application No. PCT/US2008/071988, dated Nov. 3, 2008, 5 pages.
International Preliminary Report on Patentability for International Application No. PCT/US2008/071988, dated Feb. 2, 2010, 5 pages.
International Search Report and Written Opinion for International Application No. PCT/US2008/052121, dated Aug. 6, 2008, 5 pages.
International Preliminary Report on Patentability for International Application No. PCT/US2008/052121, dated Jul. 28, 2009, 5 pages.
International Search Report and Written Opinion for International Application No. PCT/US2011/053070, dated Feb. 16, 2012, 6 pages.
International Preliminary Report on Patentability International Application No. PCT/US2011/053070, dated Mar. 26, 2013, 5 pages.
Supplementary European Search Report for European Application No. 14191347.5, dated May 4, 2015, 7 pages.
International Search Report and Written Opinion for International Application No. PCT/US2015/014133, dated Apr. 29, 2015, 8 pages.
International Search Report and Written Opinion for International Application No. PCT/US2015/024341, dated Jul. 15, 2015, 10 pages.
International Preliminary Report on Patentability for International Application No. PCT/US2015/024341, dated Oct. 4, 2016, 8 pages.
International Search Report and Written Opinion for International Application No. PCT/US2015/054314, dated Jan. 22, 2016, 10 pages.

(56) References Cited

OTHER PUBLICATIONS

International Search Report and Written Opinion for International Application No. PCT/US2016/014602, dated May 12, 2016, 9 pages.
International Search Report and Written Opinion for International Application No. PCT/US2016/041793, dated Oct. 3, 2016, 7 pages.
International Search Report and Written Opinion for International Application No. PCT/US2016/053565, dated Dec. 27, 2016, 8 pages.
Dirjish, M., "What's the difference between brush DC and brushless DC motors?", Electronic Design, Feb. 16, 2012, 5 pages.
Semiconductor Components Industries, LLC, "DC Motor Driver Fundamentals," Publication Order No. TND6041/D, ON Semiconductor [online], Mar. 2014—Rev. 1, pp. 1-9, www.onsemi.com.
Machine Design, Design FAQs, Variable Wattage Control Systems for Electric Heaters, "Moving coil motor technology," [online], Feb. 26, 2009, [Retrieved from the Internet: Jul. 31, 2015], <URL: http://machinedesign.com/motion-control/moving-coil-motor-technology>, 1 page.
Thomas Publishing Company, Product News: Mechanical Power Transmission, "Actuator and Ball Spline come in mini and micro sizes," [online], Sep. 3, 2004, [Retrieved from the Internet: Aug. 7, 2015], <URL: http://news.thomasnet.com/fullstory/455177>, 5 pages.
Luna Bearings, Automation & Power Transmission, WON Linear Motion System, "Compact Ball Spline," [online], 2009, [Retrieved from the Internet: Aug. 7, 2015], <URL: http://www.lunabearings.com/won.htm>, 6 pages.
Extended European Search Report for European Application No. 15773920.2, dated Jan. 4, 2018, 7 pages.

\* cited by examiner

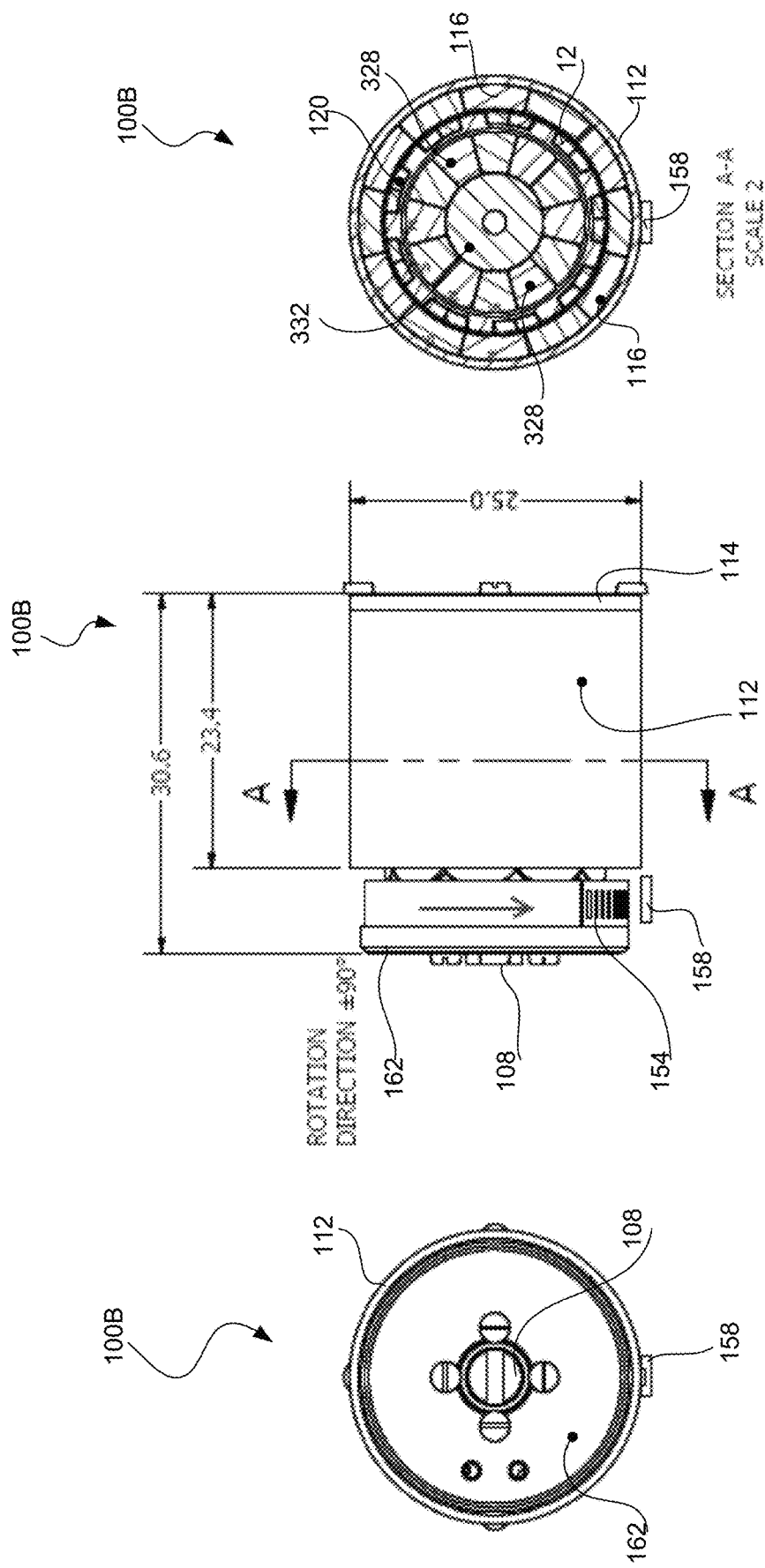

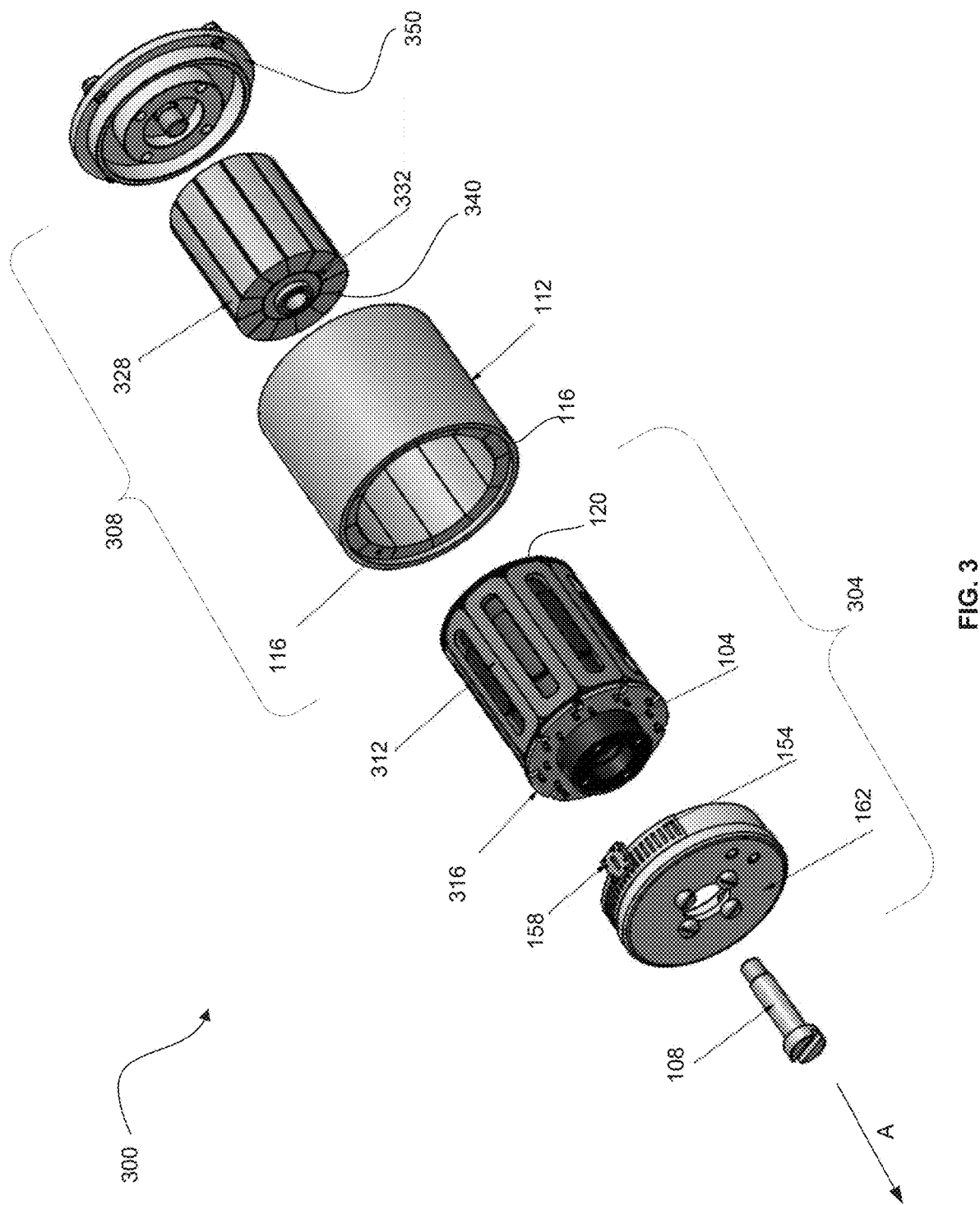

US 10,807,248 B2

DIRECT DRIVE BRUSHLESS MOTOR FOR ROBOTIC FINGER

CROSS-REFERENCE TO RELATED APPLICATIONS

This application claims priority under 35 U.S.C. 119(e) to U.S. Provisional Application No. 62/441,913, entitled HIGH-TORQUE, LOW CURRENT BRUSHLESS MOTOR, filed Jan. 3, 2017, and is a continuation-in-part of application Ser. No. 14/611,113, entitled DIRECT DRIVE MOTOR FOR ROBOTIC FINGER, filed Jan. 30, 2015, which claims priority under 35 U.S.C. 119(e) to U.S. Provisional Application No. 61/934,628, entitled DIRECT DRIVE MOTOR FOR ROBOTIC FINGER, filed Jan. 31, 2014. This application is related to U.S. application Ser. No. 13/927,076, entitled ROBOTIC FINGER, filed Jun. 25, 2013. The content of each of the foregoing applications is hereby expressly incorporated by reference in its entirety for all purposes.

FIELD

This disclosure relates generally to prosthetics and, more particularly, to a motor for a robotic finger.

BACKGROUND

There are many tasks in the workplace today that are accomplished by human hands. Some tasks are very repetitive and cause carpal tunnel problems. Others take place in hazardous environments. Still others require extremely precise movements and are gradually becoming beyond the capability of humans. Prosthetic devices can be used to replace human hands in the above and other areas.

SUMMARY

In one aspect the disclosure relates to a direct drive brushless motor for a robotic finger. The motor may include a plurality of rotational components and a plurality of non-rotational components. The plurality of rotational components include a center rotation shaft circumscribed by a plurality of coils. The plurality of non-rotational components include a plurality of outer magnets positioned around the plurality of coils. The direct drive brushless motor further includes a dual magnetic circuit formed from ones of the rotational components and non-rotational components. The dual magnetic circuit includes an outer circuit and an inner circuit wherein the outer circuit includes at least the plurality of outer magnets and the plurality of coils and wherein the inner circuit includes at least the plurality of coils and the center rotation shaft.

An exemplary approach for providing current to the plurality of coils takes into account that the motor does not need to run through complete turns of 360 degrees in order to mimic the behavior of a human finger; rather, turns of 90 or 30 degrees may be sufficient. Using this approach a plurality of electrical wires may be routed to the plurality of coils via, for example, a flex cable electrically connected to an electrical connector physically coupled to one or more of the plurality of rotational components. Since turns of less than 360 degrees are contemplated, the flex cable may be used to supply current to the plurality of coils without becoming wrapped around or otherwise entangled in the rotating components of the motor. This enables current to be conducted to the coils without using, for example, brushes or a commutator of the type employed in brushed DC motors. Moreover, because the plurality of rotational components will typically be relatively lightweight, rapid rotation and directional changes may be attained.

In another aspect the disclosure is directed to a direct drive brushless motor including a plurality of rotational components and a plurality of non-rotational components. The plurality of rotational components may include a center rotation shaft circumscribed by a plurality of coils and a coil termination plate configured to support the plurality of coils. The plurality of non-rotational components may include a plurality of outer magnets positioned around the plurality of coils. A flex cable having one or more leads provides electrical current to one or more of the plurality of coils without the use of brushes. In this aspect the direct drive brushless motor further includes a dual magnetic circuit formed from ones of the plurality rotational components and ones of the plurality non-rotational components. The dual magnetic circuit includes an outer circuit and an inner circuit wherein the outer circuit includes at least the plurality of outer magnets and the plurality of coils and wherein the inner circuit includes at least the plurality of coils and the center rotation shaft.

The disclosure also pertains to a direct drive brushless motor including a plurality of outer magnets arranged as a first Halbach cylinder. A coil assembly includes a plurality of coils surrounded by the plurality of outer magnets. The plurality of coils are connected without the use of brushes to an external source of electrical current and the coil assembly is disposed to rotate relative to the plurality of outer magnets. A plurality of inner magnets are arranged as a second Halbach cylinder and are surrounded by the plurality of coils. A core element is surrounded by the plurality of inner magnets. A center rotation shaft is positioned within an interior space circumscribed by the core element.

BRIEF DESCRIPTION OF THE DRAWINGS

The features, nature and advantages of the present disclosure will become more apparent from the detailed description set forth below when taken in conjunction with the drawings in which like reference characters identify correspondingly throughout and wherein:

FIG. 2A provides an end view of a direct drive brushless motor equipped with a linear encoder.

FIG. 2B provides a side view of the direct drive brushless motor of FIG. 2A.

FIG. 2C provides a sectional view of the direct drive brushless motor of FIG. 2A.

FIG. 3 provides a partially disassembled view of rotational components and non-rotational components of a direct drive brushless motor in accordance with the disclosure.

DETAILED DESCRIPTION

Figure 1B:
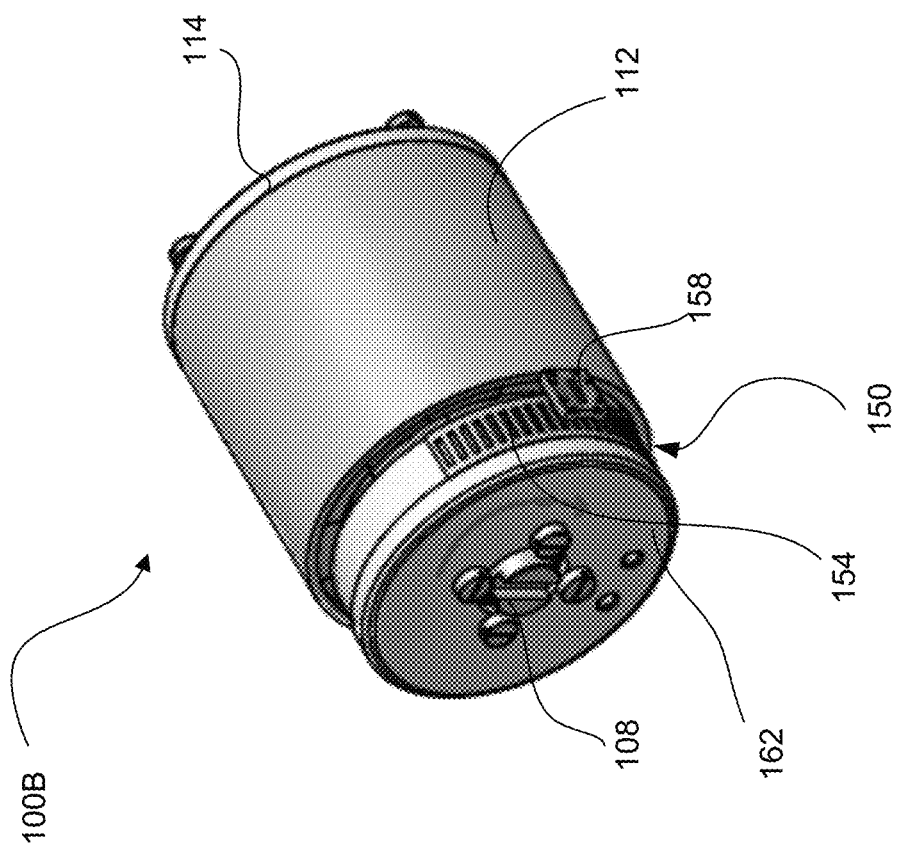
FIG. 1B illustrates a perspective view of a direct drive brushless motor equipped with a linear encoder for providing position feedback in accordance with the disclosure.

In the following description of exemplary embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the present invention.

The word "exemplary" is used herein to mean "serving as an example or illustration." Any aspect or design described herein as "exemplary" is not necessarily to be construed as preferred or advantageous over other aspects or designs.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure.

Reference will now be made in detail to aspects of the subject technology, examples of which are illustrated in the accompanying drawings, wherein like reference numerals refer to like elements throughout.

Disclosed herein are embodiments of a motor adapted to act as, for example, a servo direct drive brushless motor for a robotic finger joint. Embodiments of the motor advantageously provide a high torque output in a relatively small package size (e.g., 20 to 30 mm in diameter). In addition, embodiments of the motor draw relatively low current draw and thereby mitigate overheating.

The motor disclosed herein may be used in connection with robotic fingers designed to emulate the range of motion of human fingers. A human finger includes three joints, two of which move over a maximum range of approximately 90 degrees while a third is capable of moving through a range of approximately 30 degrees.

In one embodiment, the design of the motor takes into account that the motor does not need to run through complete turns of 360 degrees in order to mimic the behavior of a human finger; rather, turns of 90 or 30 degrees may be sufficient.

Accordingly, in one embodiment the motor comprises a partial moving-coil rotary motor. The partial rotary motor may be advantageously configured to have a light moving mass, thereby facilitating a fast response and low current draw.

Figure 1A:
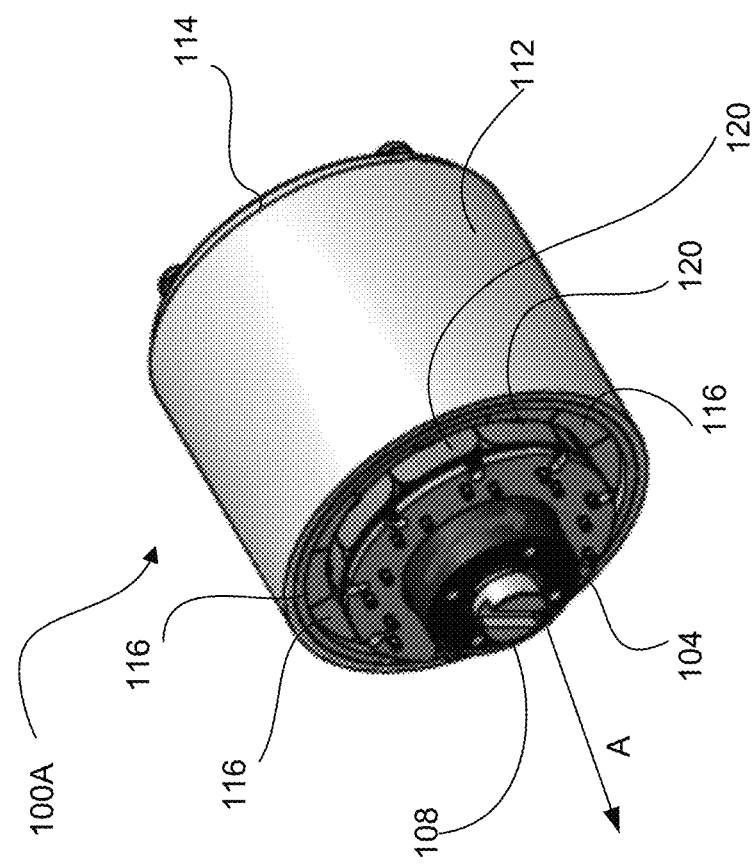
FIG. 1A illustrates a perspective view of a direct drive brushless motor in accordance with the disclosure.

Turning now to the drawings, FIG. 1A illustrates a perspective view of a direct drive brushless motor 100A in accordance with the disclosure. As shown in FIG. 1A, the direct drive brushless motor 100A can include a bobbin 104 and a center rotation shaft 108. The motor 100A further includes a motor housing 112 surrounding a plurality of outer magnets 116. During operation of the drive motor 100A, a dual magnetic circuit (described below) including a plurality of coils 120 causes a plurality of rotational components including the bobbin 104 and center rotation shaft 108 to rotate about a longitudinal axis A. The motor housing 112, plurality of outer magnets 116 and a back plate support 114 do not rotate during operation of the drive motor 100A.

FIG. 1B illustrates a perspective view of a direct drive brushless motor 100B equipped with a linear encoder for providing position feedback in accordance with the disclosure. In one embodiment the direct drive brushless motor 100B is substantially identical to the direct drive brushless motor 100A but further includes a linear encoder assembly 150 having a linear encoder feedback scale 154 and a linear feedback scale read head 158. The linear encoder feedback scale 154 is supported by a linear scale support 162. As is discussed further below, the read head 158 provides, to an external computing element or device (not shown), position feedback information concerning rotation of the plurality of rotational components of the direct drive brushless motor 100B.

FIGS. 2A, 2B and 2C respectively provide end, side and sectional views of the direct drive brushless motor 100B of FIG. 1B.

Attention is now directed to FIG. 3, which provides a partially disassembled view of a direct drive brushless motor 300 including a linear encoder assembly for providing position feedback information in accordance with the disclosure. In particular, the direct drive brushless motor 300 includes a plurality of rotational components 304 and a plurality of non-rotational components 308. In a particular implementation the plurality of rotational components 304 include a set of 9 coils 312 arranged to form an annular structure. In other implementations a different number of coils 312 may be used (e.g., 6, 12 or 18 coils). These coils 312 may operate like brushless DC coils with a pitch of 40 degrees. In other embodiments the coils may be comprised of flat wire. Note that other quantities may also be used such as series 9 coils or parallel 3 coils. The coils may be wired Y and series. In one embodiment the coils are substantially rectangular and are molded with a radius that results in an assembly diameter of 18.8 mm and a total resistance of 30 Ohms. The coils 312 are attached to a termination plate 316. For example, the coils 312 may be glued to the termination plate 316 or a molded structure (not shown) may be included on the termination plate 316 to receive the coils 312.

As shown in FIG. 3, the plurality of non-rotational components include a plurality of inner magnets 328 and a steel core 332. A cylindrical sleeve 340 dimensioned to circumscribe the center rotation shaft 108 is surrounded by the steel core 332. In one embodiment the plurality of non-rotational components 308 includes a back plate 350 configured with a plurality of circular channels for appropriately guiding and centering the remainder of the non-rotational components 308. As shown, circular channel 370 of the back plate 350 receives the annular structure formed by coils 312.

During operation of the direct drive brushless motor 300, current is introduced through the coils 312 thereby creating a magnetic field having a direction that depends on the direction that the current is flowing through the coils 312.

The magnitude of the magnetic field corresponds to the number of turns associated with each coil and the amperage conducted through the conductive material. It should be understood that any type of conductive material with varying specifications can be used. It should further be understood that the coils 312 may be electrically connected to a power source and/or connected together in any manner known in the electrical and mechanical arts.

The outer magnets 116 can be, for example, substantially rectangular with a curved cross section as shown in FIG. 3, and can be coupled to an interior wall of the motor housing 112. For example, the outer magnets 116 can be coupled to the motor housing 112 during manufacturing with various adhesives and/or screws. The outer magnets 116 can be adapted to magnetically interface with the rotational components 304 when a magnetic field is present in the coils 312. Hence, by repeatedly alternating the direction that current is flowing through the coils 312, a rotational force may be repeatedly imparted upon the rotational components 304, thus making the components 304 rotate about the longitudinal axis A.

As noted above, the linear encoder assembly 150 includes a linear encoder feedback scale 154 and a linear feedback scale read head 158. The linear encoder feedback scale 154 is supported by a linear scale support 162. The linear encoder assembly 150 can also include feedback circuitry (not shown) along with the linear encoder feedback scale 154 for indicating linear positional feedback to, for example, a controller (such as a remote computer). The linear feedback scale read head 158 (e.g., a sensor, a transducer etc.), can be paired with the linear encoder feedback scale 154 that can encode position. The linear feedback scale read head 158 can read the linear encoder feedback scale 154 and convert the encoded position into an analog or digital signal. This in turn can then be decoded into position data by a digital readout (DRO) or motion controller (not shown in FIGS. 1-3). The linear encoder assembly 150 can work in either incremental or absolute modes. Motion can be determined, for example, by change in position over time. Linear encoder technologies can include, for example, optical, magnetic, inductive, capacitive and eddy current. Optical linear encoders are common in the high resolution market (e.g., the semiconductor industry market and/or the biotechnology industry market) and can employ shuttering/Moiré, diffraction or holographic principles. Typical incremental scale periods can vary from hundreds of micrometers down to sub-micrometer, and following interpolation can provide resolutions as fine as 1 nm. The linear encoder assembly 150 can have a resolution in the range of, for example, 5 microns to 50 nm. In other embodiments, finer resolution encoders can also be incorporated providing resolutions up to, for example, 1 nm.

The linear encoder feedback scale 154 may include a series of stripes or markings running along a length of the linear encoder feedback scale 154. During operation of the direct drive brushless motor 100B/300, the linear feedback scale read head 158 (e.g., an optical reader) can count the number of stripes or markings read in order to determine the current position of the rotational components 304 relative to the non-rotational components 308. In some instances, the recorded positional data can be transmitted to a remote device for monitoring purposes. In some instances, a user can input one or more values to a remote device (such as a connected computer) in order to designate an amount of rotation desired for a particular task. These values can then be transmitted to a controller (not shown in FIGS. 1-3) in electrical communication with the linear encoder assembly 150 such that relative rotation of the plurality of rotational components 304 can be adjusted according to the values specified. The direct drive brushless motor 100/300 may include any number of electrical connections and may include any number of electronic control sequences. Furthermore, in other embodiments, the direct drive brushless motor 100/300 may include any number of on-board digital control and/or analog circuitry known in the electrical arts.

Again referring to FIG. 3, embodiments of the direct drive brushless motor may utilize a dual magnetic circuit in order to obtain higher torque. Specifically, the outer magnets 320, steel housing 324 of the motor, and coils 312 form a first circuit 380. The coils 312, inner magnets 328 and center rotation shaft 108 form a second circuit 384. This arrangement is believed to provide substantially more torque than is capable of being provided by standard brushless motors employing only a single "outer" circuit.

As an example, a unit that has been developed utilizing this arrangement has a diameter of 25 mm and produces a torque of 0.2 Nm. This in turn yields, at 30 mm from the center of the motor, a resultant force of 6.7N (at 48 VDC and 1.5 amps peak). This is slightly less than but comparable to the force of 8 to 10 N capable of being produced by a typical human finger at the same distance from the 3rd joint.

As is discussed below with reference to FIG. 6, embodiments of the direct drive brushless motor may include various rotation-limiting elements disposed to limit rotation of the rotating components 304 to a desired extent (e.g., +/−90 degrees) about the axis of rotation A (FIG. 1A).

The motors described herein may be used as robotic joint drives providing near-human capabilities. The use of direct drive advantageously results in the motor being relatively compliant with respect to external forces; that is, the motor will move freely when outside forces are applied. This contrasts with the typical behavior of geared motors, which may lock up and become damaged upon the application of such external force.

Figure 4:
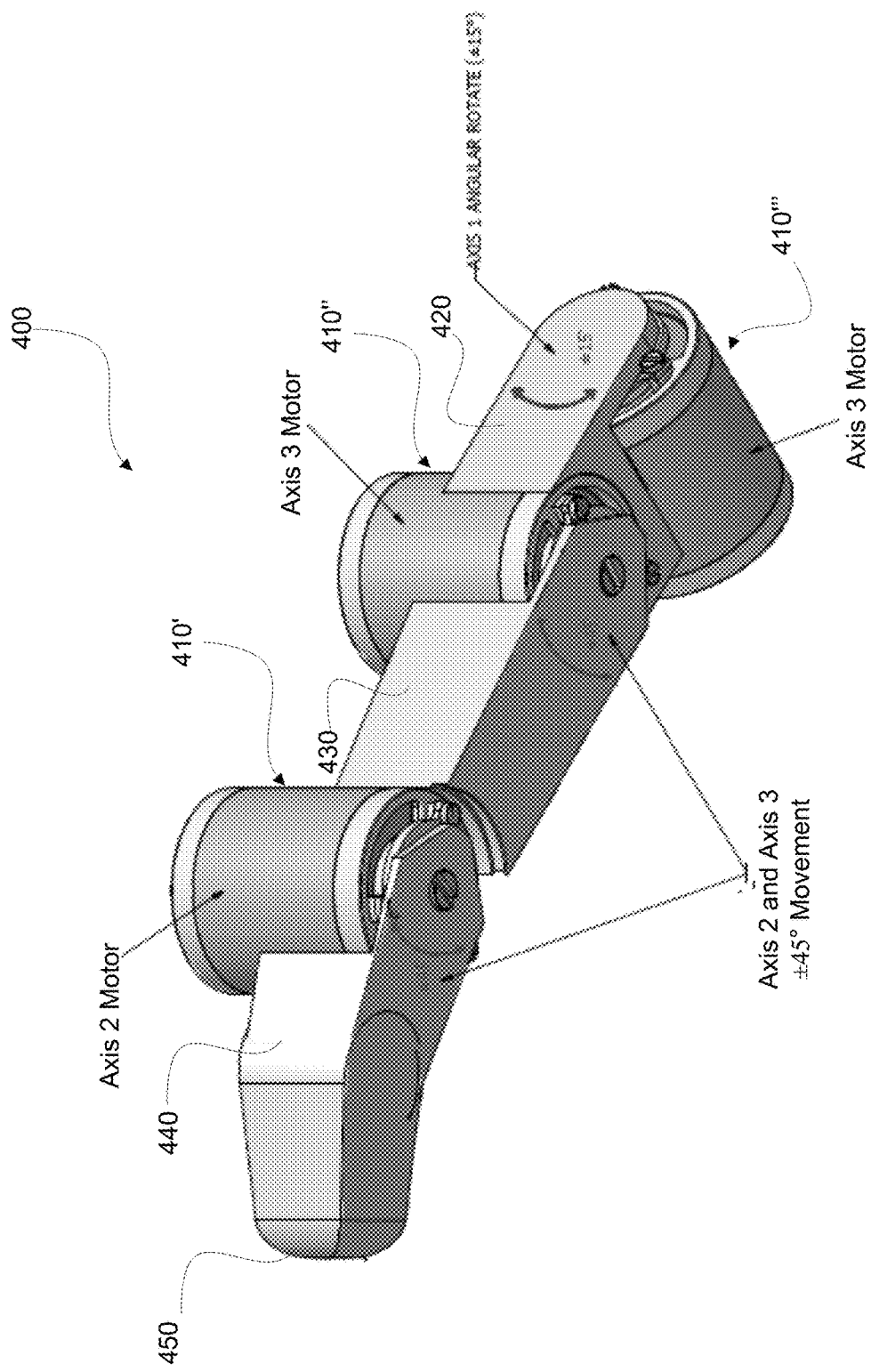
FIG. 4 illustrates a perspective view of a robotic finger which includes a set of direct drive brushless motors in accordance with the disclosure.

Attention is now directed to FIG. 4, which illustrates a perspective view of a robotic finger 400 including a set of direct drive brushless motors in accordance with another aspect of the disclosure. Robotic finger 400 includes three axes of movement—axis 1, axis 2, and axis 3. As shown, robotic finger 400 includes an axis 1 direct drive brushless motor 410', an axis 2 direct drive brushless motor 410" and an axis 3 direct drive brushless motor 410'''. Although axis 1, axis 2, and axis 3 are illustrated as providing ranges of ±15 degrees, ±45 degrees, and ±45 degrees, respectively, other variations of the direct drive brushless motors 410 may have different ranges. The direct drive brushless motors 410 may be implemented to be substantially identical to, for example, the direct drive brushless motor 100A or 100B, but are configured in the manner illustrated in order to effect the particular ranges of motion required by the robotic finger 400. Specifically, the axis 1 motor 410' may move a first elongate member 420 though ±15 degrees about axis 1, the axis 2 motor 410" may move a second elongate member 430 through ±45 degrees about axis 2, and the axis 3 motor 410''' may move a third elongate member 440 through ±45 degrees about axis 3. As shown, the third elongate member 440 includes a fingertip element 450.

Figure 5A:
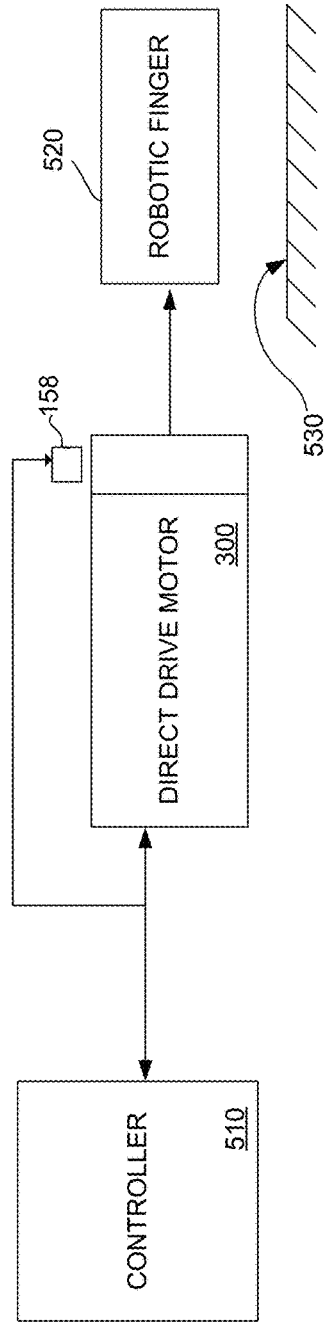
FIG. 5A is a block diagram of an exemplary arrangement of a direct drive brushless motor and an associated controller.

FIG. 5A shows a block diagram of an exemplary arrangement 500 of the direct drive brushless motor 300 and an associated controller 510. In the embodiment of FIG. 5A the motor 300 may be integrated within a joint of a robotic finger 520 or otherwise mechanically coupled to the robotic finger 520. During operation of the motor 300, the read head 158 of the linear encoder provides a feedback signal containing information related to the position or angular orientation of the bobbin 104 and/or center rotation shaft 108. Controller 510 processes the feedback signal and provides a control signal to the motor 300 to adjust the rotation of the bobbin 104 and/or center rotation shaft 108 so as to appropriately move the robotic finger 520 in accordance with the procedures below.

Specifically, the direct drive brushless motor described herein may also be configured to implement the "soft land" and programmable force methods patented by the assignee of the present application. These allow a robotic finger 520 to closely approximate the capability of a human finger to softly contact surfaces and then apply force. In one embodiment, the motor 300 sends measurements from its linear encoder to the controller 510 to indicate the precise rotational position about the axis A. In this way a portion of the robotic finger 520 or other mechanical element coupled to the motor 300 may be moved to an approach position relatively close to, but safely away from, a target surface 530 of an object of interest. From the approach position, a "soft-land" operation may be optionally performed whereby the robotic finger 520 is brought into contact with the target surface 530 by the motor 300 so as not to damage either the robotic finger 520 or the surface 530. Additional information about the soft-land operation is set forth in U.S. Pat. No. 5,952,589 entitled "Soft Landing Method for Tool Assembly" (the "'589 patent") and U.S. Publication No. 2005/0234565 entitled "Programmable Control System for Automated Actuator Operation", respectively, both of which are hereby incorporated by reference in their entireties for all purposes.

As is discussed in the '589 patent, the soft-land procedure typically involves placing the robotic finger 520 at an approach position. This approach position can be arbitrarily established in accordance with the desires of the operator, but preferably, the approach position places the robotic finger 520 much closer than about one millimeter away from the target surface 530. The approach position will generally be dependent on the characteristics of the target surface 530; namely, the approach position can be made to be closer to objects with smooth target surfaces relative to rougher surfaces without substantially increasing the risk of forceful, inadvertent contact. In any event, the robotic finger 520 is placed at the approach position for subsequent movement along a path from the approach position into soft contact with a predetermined point on the target surface 530.

Initially, the robotic finger 520 is held stationary at the approach position. Then, the forces which are acting to hold the robotic finger 520 stationary are changed by the motor 300 in magnitude until the inherent static friction forces that have been acting on the robotic finger 520 are overcome. When the static friction forces have been overcome, the system becomes dynamic and the robotic finger 520 advances toward the target surface 530 under the influence of the resultant force.

As the robotic finger 520 is advanced toward the target surface 530, it is moved rapidly in a position mode until the approach position. From the approach position, the robotic finger 520 proceeds in a soft land mode until contact is made with the target surface 530. Specifically, several control modes of operation for determining soft contact are possible. In particular, each of these control modes depends on a measurable parameter that is characteristic of the movement of the robotic finger 520. These measurable parameters include i) the finger's travel position on the path toward the surface 530 (i.e. a position control mode), ii) its velocity (i.e. a velocity control mode), and iii) the acceleration/deceleration of the finger 520 (i.e. torque control mode). In an alternate embodiment, none of the above mentioned measurable parameters are monitored and, instead, the finger 520 is allowed to merely advance into soft contact with target surface 530 under the influence of the resultant force (i.e. a basic mode). The position control mode of operation, velocity control mode of operation and the torque control mode of operation are described in further detail in the '589 patent.

In some configurations, the controller 510 can be, for example, a Galil DMC31012 controller with built-in amplifier and a 16 bit analog output.

As is known, the controller 510, such as a servo controller, can generate control signals that operate the motor 300. For example, in accordance with programmed instructions, typically in the form of software, the controller 510 can generate control signals and output such control signals to the motor 300 to cause movement of the robotic finger 520. In one embodiment the controller 510 is programmed to control the motor 300 depending on the particular application for which the finger 300 is being utilized. Typically, a computer (not shown) is coupled to the controller 510 to generate and transmit software (code representing a set of instructions to be executed) generated in a programming language to the controller 510 for the specific application. Such software, once running on the controller 510, will instruct the motor 300 to move the robotic finger 520 in a manner specific to the particular application or task.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, FORTRAN, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Figure 5B:
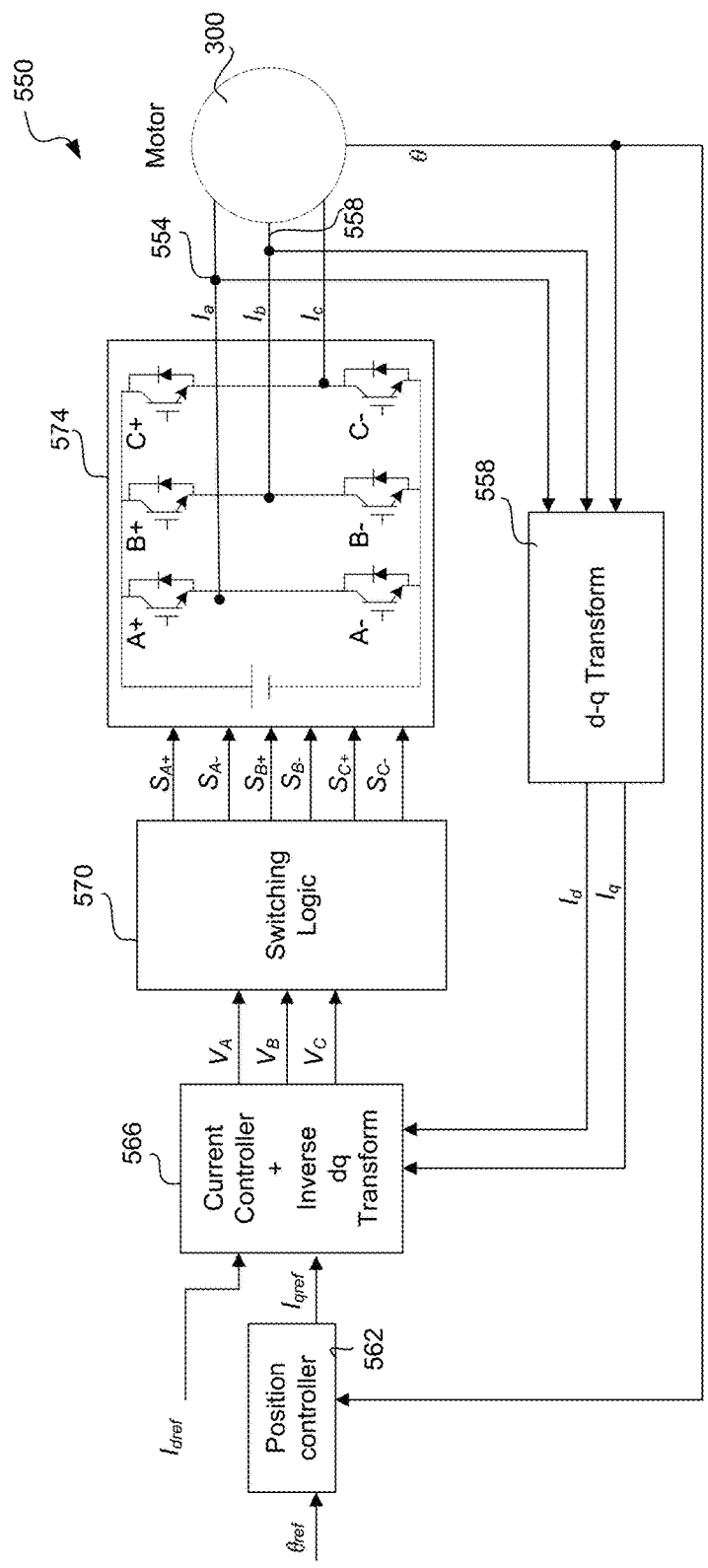
FIG. 5B, a functional block diagram is provided of a motor control apparatus which may be incorporated within the controller of FIG. 5A or, alternatively, within the direct drive motor of FIG. 5A.

Turning to FIG. 5B, a functional block diagram is provided of a motor control apparatus 550 which may be incorporated within the controller 510 or, alternatively, within the direct drive motor 300. In the embodiment of FIG. 5B the motor control apparatus 550 operates to drive the coils 312 of the motor 300 through sinusoidal commutation using a direct-quadrature (d-q) control process. That is, each coil phase is energized by a continuous sinusoidal current to produce motion at a constant torque.

During operation the motor control apparatus 550 functions to control currents flowing through the coils 312. To this end a first current sensor 554 detects a first current $I_a$ flowing through one of the coils 312 and a second current sensor 558 detects a second current $I_b$ flowing through another of the coils 312. As shown, measurements of the currents $I_a$, $I_b$ and an actual position signal (θ) from the encoder read head 158 (or other position sensor operative to detect the angular positon of a rotating component of the motor 300) are supplied to a d-q transform module 558 configured to implement a d-q transform (also known as a Park transform). As is known, the d-q transform may be used to effectively transform or otherwise project a three-phase system onto a two-dimensional control space. Although in the general case implementation of the d-q transform requires $I_c$ in addition to $I_a$, $I_b$ and θ, in the present embodiment the 3-phase coils of the motor 300 are balanced and thus $I_c$ can be reconstructed from $I_a$ and $I_b$.

Implementation of the Park transform enables the module 558 to express the set of three sinusoidal currents present on the coils 312 as a direct axis current $I_d$ and a quadrature axis current $I_q$. Since the Park-transformed currents $I_d$, $I_q$ are essentially constant, it becomes possible to control the motor 300 by using the constant currents $I_d$, $I_q$ rather than the sinusoidal signals actually supplied to the motor 300.

As shown in FIG. 5B, the control apparatus 550 includes a position control module 562 that receives a signal indicative of a reference angle ($\theta_{ref}$) as well as the actual position signal $\theta$ from the encoder read head 158. Based upon these values the position control module 562 provides a quadrature axis reference current $I_{q,ref}$ to a current controller and inverse d-q transform module 566. The current controller within the module 566 determines differences between the Park-transformed currents $I_d$, $I_q$ and the reference currents $I_{q,ref}$, $I_{d,ref}$ and performs an inverse d-q transform based upon the results. These operations yield command values $V_A$, $V_B$ and $V_C$ which are then mapped into inverter switching signals $S_{A+}$, $S_{A-}$, $S_{B+}$, $S_{B-}$, $S_{C+}$, $S_{C-}$, by switching logic 570. A 3-phase voltage source inverter 574 under the control of these switching signals then generates the currents $I_a$, $I_b$, $I_c$ delivered to the coils 312.

Figure 5D:
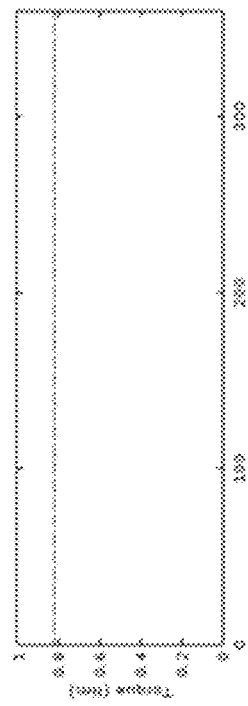
FIG. 5D graphically represents an essentially constant torque produced by a motor in response to the winding currents represented in FIG. 5C.
Figure 5C:
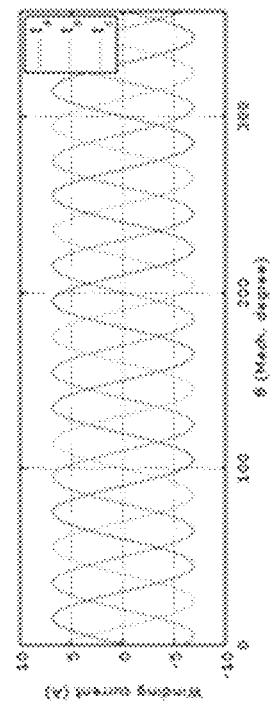
FIG. 5C graphically represents an exemplary set of winding currents produced by the motor control apparatus of FIG. 5B for a motor having six pole pairs.

FIG. 5C illustrates an exemplary set of winding currents produced by the motor control apparatus for an embodiment of the motor 300 including six pole pairs. As shown in FIG. 5D, these winding currents result in the motor generating an essentially constant torque.

Figure 6A:
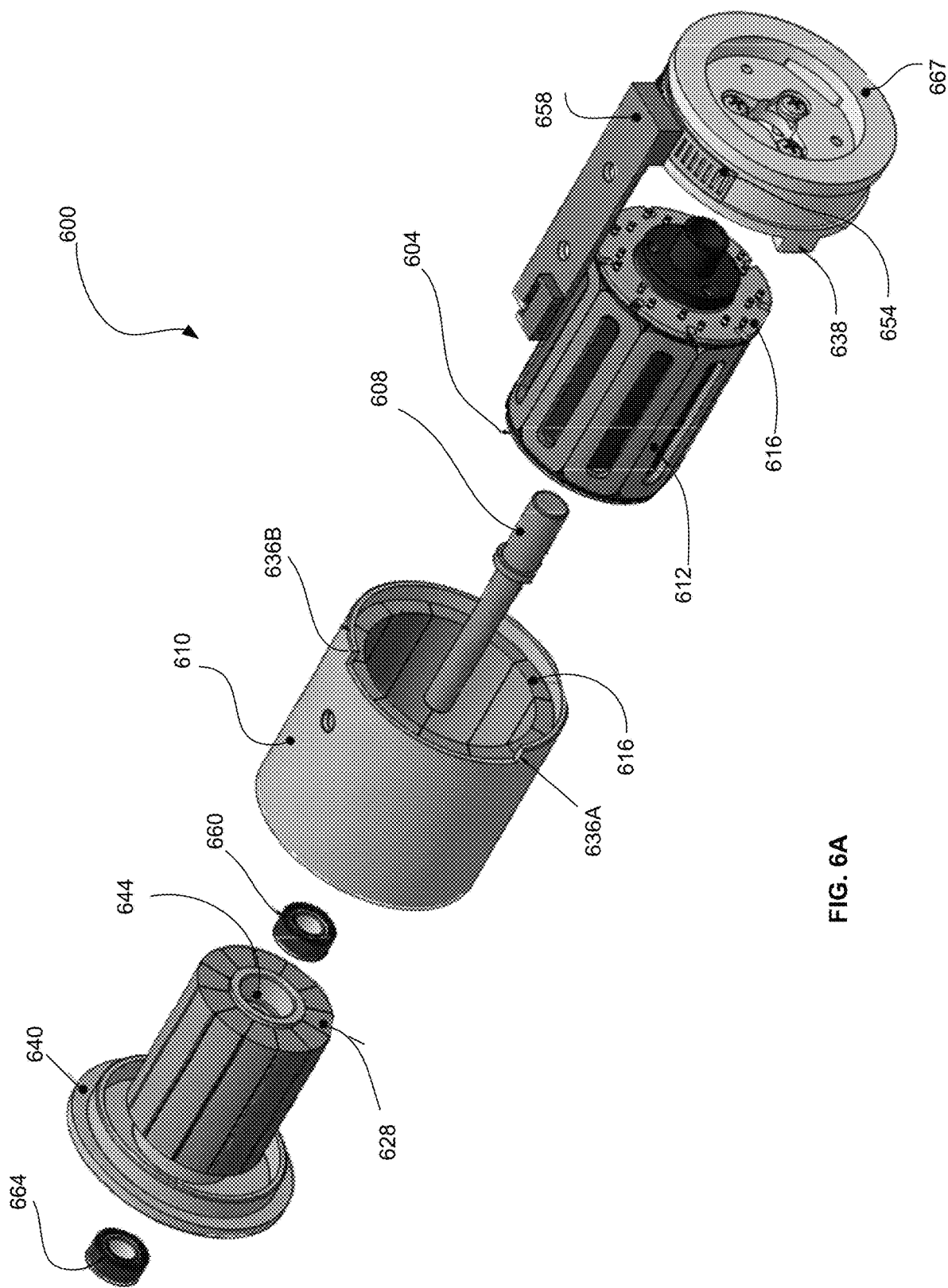
FIG. 6A provides a partially disassembled view a direct drive brushless motor which includes rotation-limiting elements configured to limit rotation of rotating components of the motor to within a desired range.
Figure 6B:
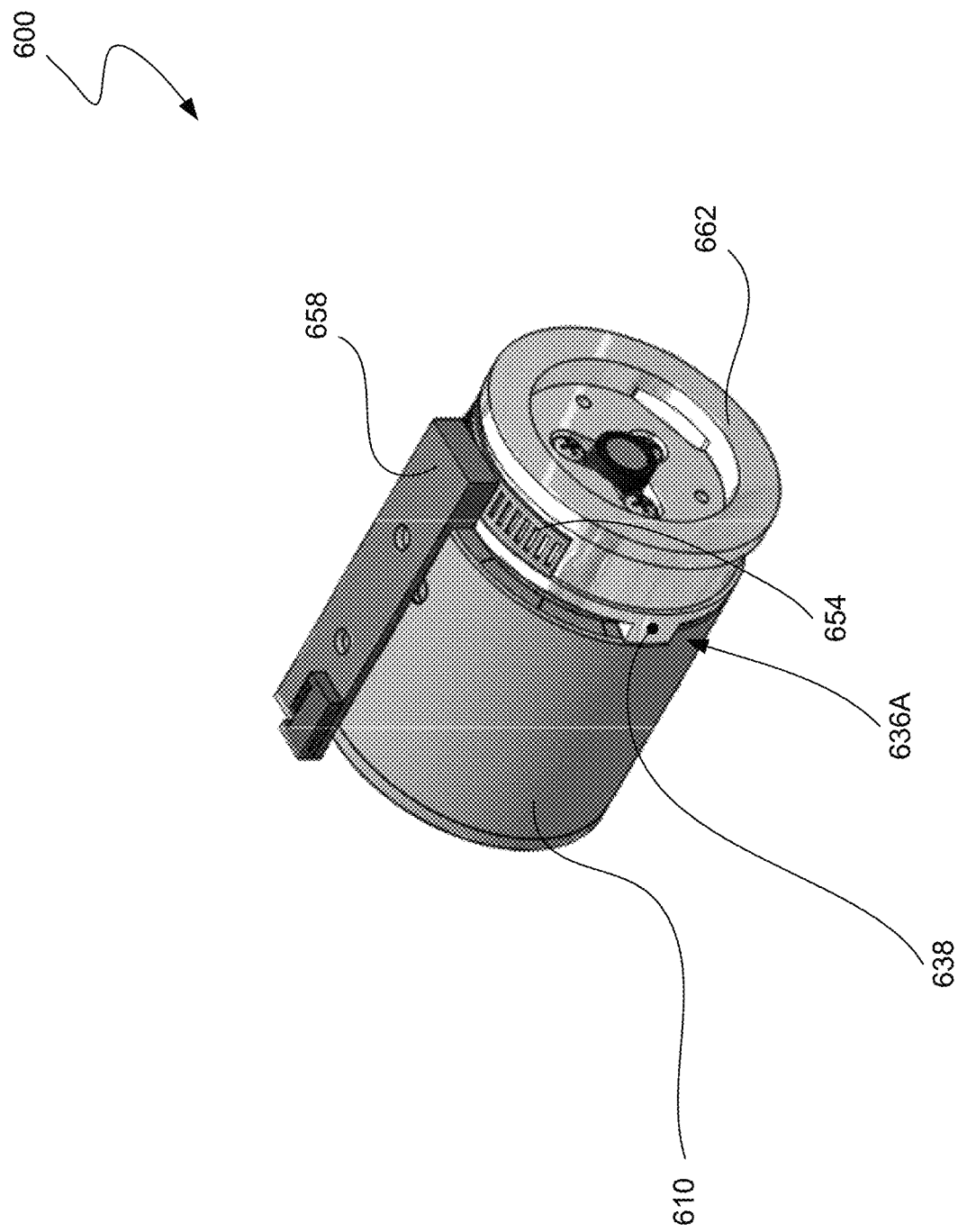
FIG. 6B provides an assembled view of the direct drive brushless motor of FIG. 6A.

Attention is now directed to FIG. 6A, which provides a partially disassembled view of a direct drive brushless motor 600 including rotation-limiting elements configured to limit rotation of rotating components of the motor 600 to within a desired range (e.g., 90 degrees). FIG. 6B provides an assembled view of the direct drive brushless motor 600. As shown in FIG. 6A, the direct drive brushless motor 600 includes a set of 9 rotating coils 612 arranged to form an annular structure. In other implementations a different number of coils 612 may be used (e.g., 6, 12 or 18 coils). These coils 612 may operate like brushless DC coils with a pitch of 40 degrees. In other embodiments the coils may be comprised of flat wire. Note that other quantities may also be used such as series 9 coils or parallel 3 coils. The coils may be wired Y and series. The coils 612 are attached to a termination plate 616. For example, the coils 612 may be glued directly to the termination plate 616; alternatively, a molded structure (not shown) may be included on the termination plate 616 to receive the coils 612.

As shown in FIG. 6A, the direct drive brushless motor 600 can include a bobbin 604 and a center rotation shaft 608. The motor 600 further includes a motor housing 610 surrounding a plurality of outer magnets 616. During operation of the drive motor 600, a dual magnetic circuit (described below) including the plurality of coils 612 causes the rotational components of the motor 600, which include the bobbin 604 and center rotation shaft 608, to rotate about a longitudinal axis of the motor aligned with the shaft 608. Rotation of these components may be constrained within a desired range by rotation limiting surfaces 636 of the motor housing 610 in cooperation with a rotation stopper element 638. The motor housing 610, plurality of outer magnets 616 and a back plate 640 do not rotate during operation of the motor 600.

The direct drive brushless motor 600 may further include a plurality of non-rotational inner magnets 628. The back plate 640 supports a center pole structure 644 circumscribed by the non-rotational inner magnets 628. The motor 600 further includes a front ball bearing 660 and rear ball bearing 664. A linear encoder assembly includes a linear encoder feedback scale 654 and a linear feedback scale read head 658. The linear encoder feedback scale 654 is supported by a motor hub 662. The read head 658 provides, to an external computing element or device (not shown), position feedback information concerning rotation of the rotational components of the direct drive brushless motor 600.

Embodiments of the direct drive brushless motor 600 may utilize a dual magnetic circuit in order to obtain higher torque. Specifically, the outer magnets 616, center pole 644, and coils 612 form a first circuit. The coils 612, inner magnets 628 and center rotation shaft 608 form a second circuit. This arrangement is believed to provide substantially more torque than is capable of being provided by standard brushless motors employing only a single "outer" circuit.

Figure 7:
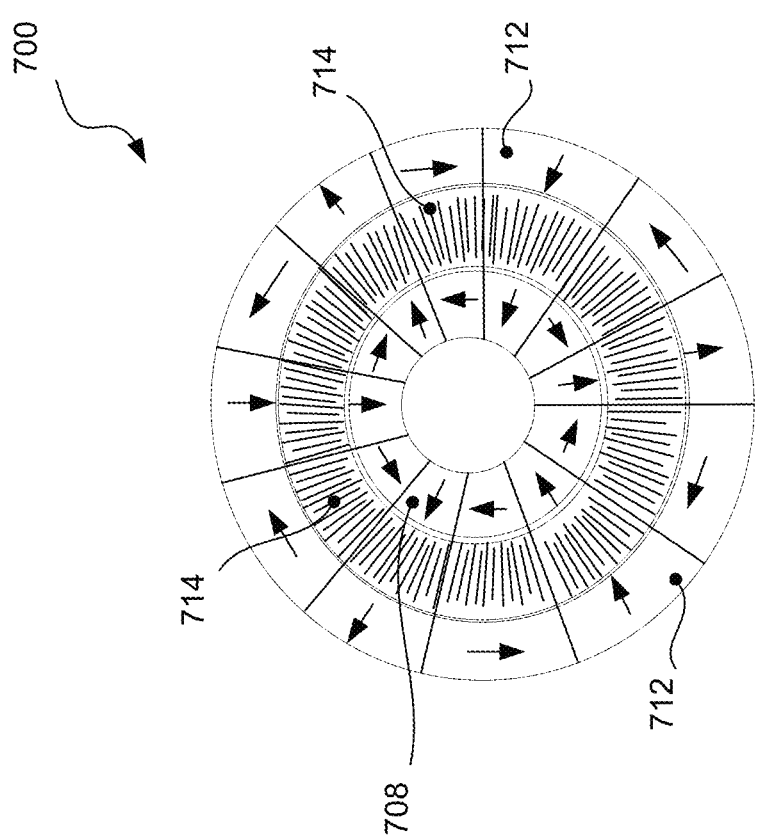
FIG. 7 provides a sectional view of components of a direct drive brushless motor incorporating a Halbach magnet arrangement.

Turning now to FIG. 7, a sectional view of components of a direct drive brushless motor 700 incorporating a Halbach magnet arrangement is provided. As shown, in the embodiment of FIG. 7, a plurality of inner magnets 708 are arranged so as to form an inner Halbach cylinder and a plurality of outer magnets 712 are arranged so as to form an outer Halbach cylinder. A plurality of coils 714 are arranged in the shape of a cylinder and interposed between the plurality of inner magnets 708 and the plurality of outer magnets 712. The plurality of inner magnets 708 and the plurality of outer magnets 712 are included within dual magnetic circuits which cooperate to increase the flux density of the magnetic field between them. Specifically, the inner magnets 708 and outer magnets 712 increase the magnetic field in the volume in which the plurality of coils 714 are disposed. This increased flux density results in a higher output torque for a given current level relative to conventional designs employing only a single "outer" magnetic circuit. The remaining components of the direct drive brushless motor 700 are substantially similar or identical to those described with reference to FIGS. 1-6 and have been omitted from FIG. 7 for purposes of clarity.

Figure 8:
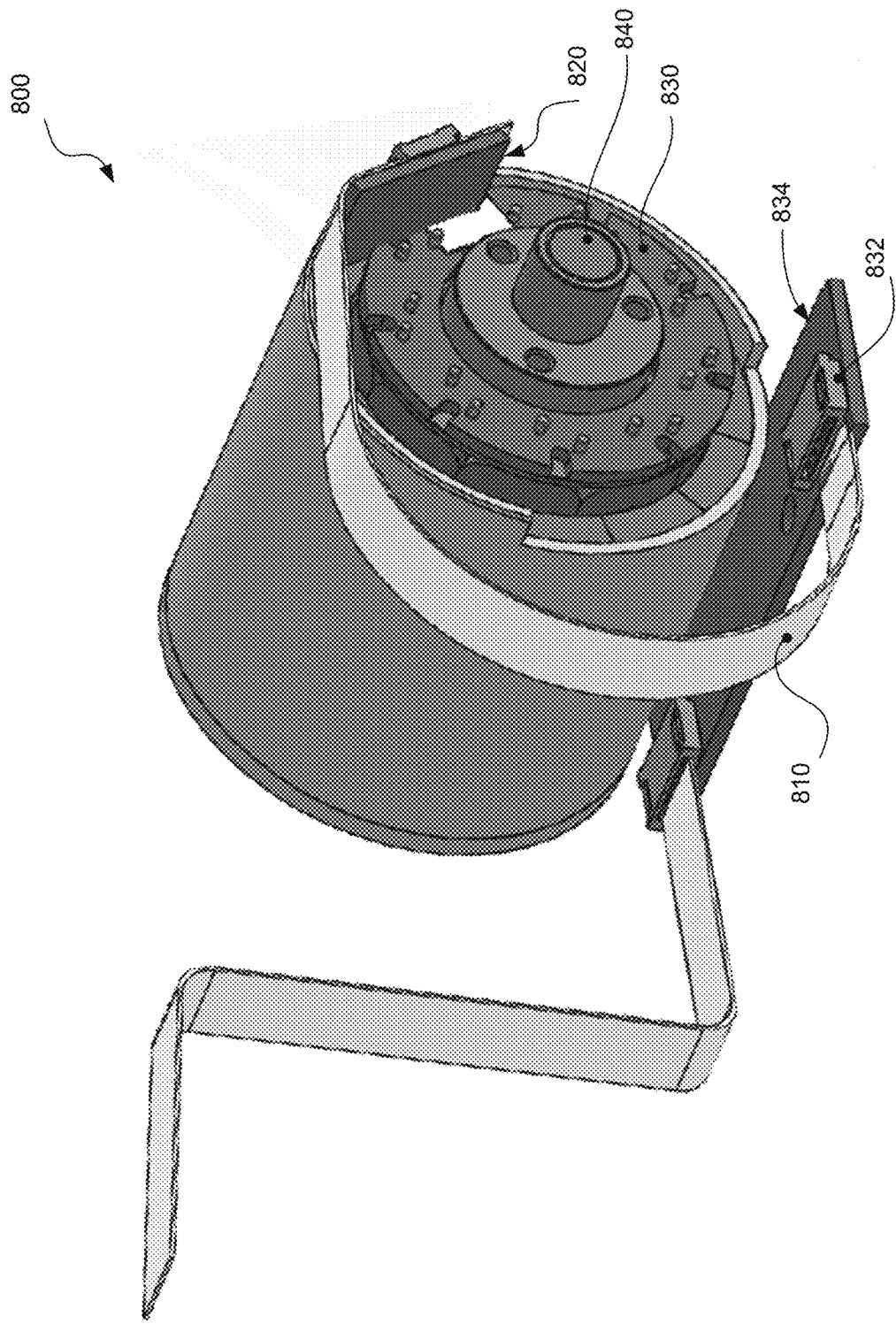
FIG. 8 provides a partially disassembled and perspective view of a direct drive brushless motor.

Attention is now directed to FIG. 8, which provides a partially disassembled and perspective view of a direct drive brushless motor 800 illustrating one manner in which a flex cable 810 may be used to, among other things, supply electrical current to a plurality of coils (not shown in FIG. 8). The direct drive brushless motor 800 may include pluralities of rotational and non-rotational components substantially similar or identical to those described with reference to FIGS. 1-6.

As shown in FIG. 8, one end of the flex cable 810 is connected to an electrical connector 820 attached to a coil termination plate 830 of the motor 800. Another end of the flex cable 810 is connected to a second electrical connector 832 mounted on a base surface 834. The flex cable 810 may include, for example, a set of 16 electrically conductive wires connected to the electrical connector 820. In other embodiments flex cables with more or fewer electrical conductors may be used.

The flex cable 810 may facilitate communication between an external controller (not shown) and the plurality of coils so that, for example, the external controller can control the rotation rate and positioning of the shaft 840. In one embodiment electrical current from the external controller may be provided to flex cable 810 via the second electrical connector 832.

The design of the motor 800 is based in part upon the realization that the motor 800 need not run through complete turns of 360 degrees in order to mimic the behavior of a human finger; rather, turns of 90 or 30 degrees may be sufficient. Since turns of less than 360 degrees are contemplated, the flex cable 810 may be used to supply current to the plurality of coils without becoming wrapped around or otherwise entangled in the rotating components of the motor as the coil termination plate 830 rotates through turns of less than 360 degrees. Thus, the flex cable 810 may provide current to the coils of the motor 800 without using, for example, brushes or a commutator of the type employed in brushed DC motors.

Figure 9:
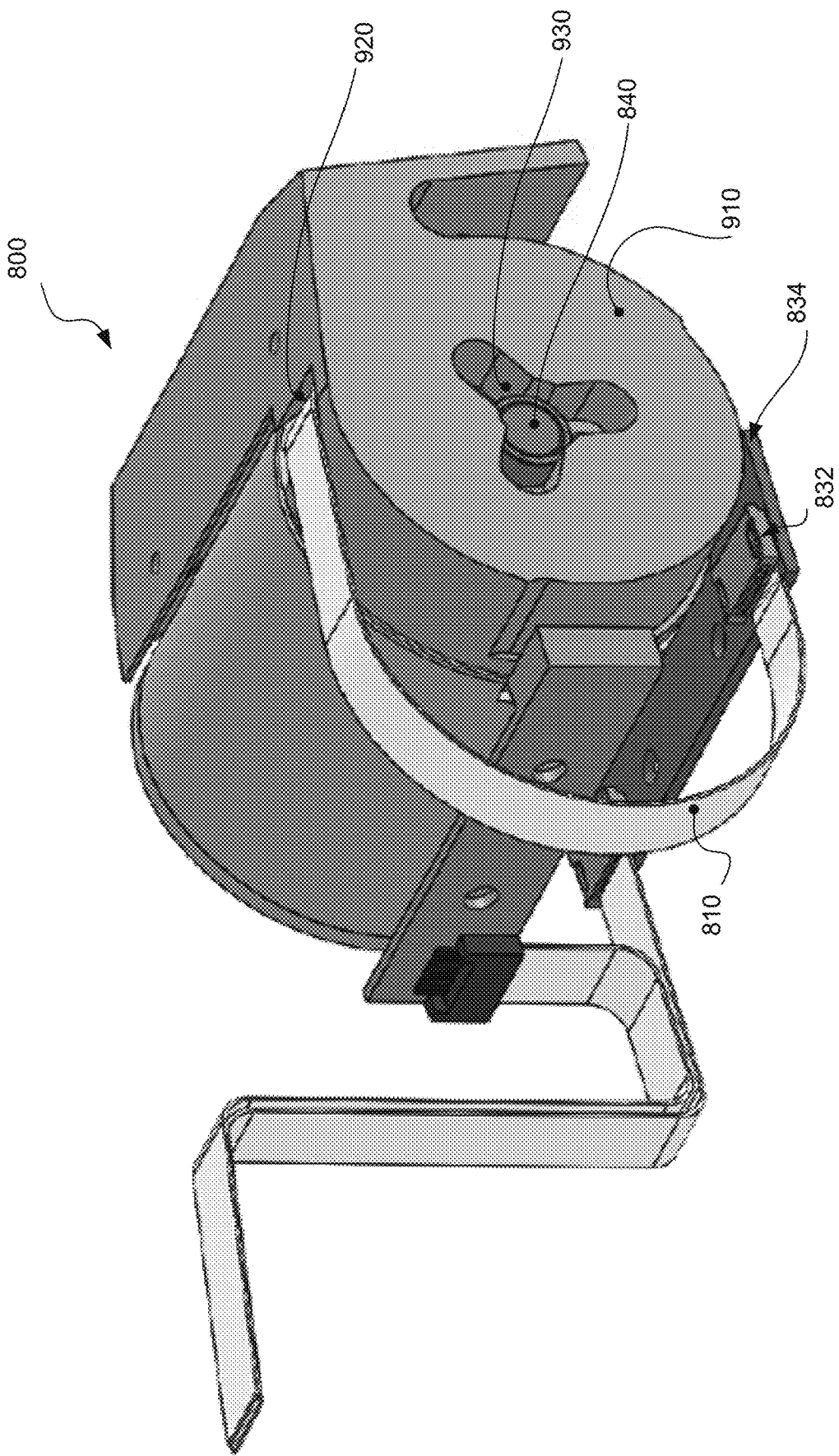
FIG. 9 is an alternate perspective view of a direct drive brushless motor.

Turning now to FIG. 9, an alternate perspective view of the direct drive brushless motor 800 is provided. As shown, the motor 800 may include a cover 910 that encloses the coil termination plate 830 and partially encloses the flex cable 810. The cover 910 defines a slot 920 through which the flex cable 810 moves as the coil termination plate 830 rotates back and forth. In addition, the cover 910 defines an aperture 930 circumscribing the shaft 840.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention. The various embodiments of the invention should be understood that they have been presented by way of example only, and not by way of limitation. Likewise, the various diagrams may depict an example architectural or other configuration for the invention, which is done to aid in understanding the features and functionality that can be included in the invention. The invention is not restricted to the illustrated example architectures or configurations, but can be implemented using a variety of alternative architectures and configurations. Additionally, although the invention is described above in terms of various exemplary embodiments and implementations, it should be understood that the various features and functionality described in one or more of the individual embodiments are not limited in their applicability to the particular embodiment with which they are described. They instead can, be applied, alone or in some combination, to one or more of the other embodiments of the invention, whether or not such embodiments are described, and whether or not such features are presented as being a part of a described embodiment. Thus the breadth and scope of the invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. For example, "at least one" may refer to a single or plural and is not limited to either. The presence of broadening words and phrases such as "one or more," "at least," "but not limited to", or other like phrases in some instances shall not be read to mean that the narrower case is intended or required in instances where such broadening phrases may be absent.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only to be seen as references to suitable means for providing the described functionality, rather than indicative of a strict logical or physical structure or organization.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A direct drive brushless motor, comprising:
a plurality of rotational components including a center rotation shaft circumscribed by a plurality of coils and a coil termination plate configured to support the plurality of coils wherein the center rotation shaft is configured to rotate about a longitudinal axis and wherein each of the plurality of coils are substantially rectangular and defined by a first dimension parallel to the longitudinal axis and a second dimension transverse to the first dimension wherein the first dimension is longer than the second dimension;
a plurality of non-rotational components including a plurality of inner magnets and a plurality of outer magnets wherein the plurality of outer magnets are positioned around the plurality of coils;
a flex cable having a first end and a second end, and including a plurality of electrically conductive wires for providing electrical current to one or more of the plurality of coils without the use of brushes;
a dual magnetic circuit formed from ones of the plurality rotational components and ones of the plurality non-rotational components, the dual magnetic circuit including an outer circuit and an inner circuit wherein the outer circuit includes at least the plurality of outer magnets and the plurality of coils and wherein the inner circuit includes at least the plurality of coils and the plurality of inner magnets;
a first electrical connector coupled to the coil termination plate wherein the first electrical connector is attached to the plurality of electrically conductive wires at the first end of the flex cable and to one or more of the plurality of coils; and
a second electrical connector connected to the plurality of electrically conductive wires at the second end of the flex cable, the second electrical connector being attached to a base surface.

2. The direct drive brushless motor of claim 1 further including an electrical connector coupled to the coil termination plate wherein the electrical connector is attached to the plurality of electrically conductive wires and to one or more of the plurality of coils.

3. The direct drive brushless motor of claim 1 further including one or more rotation-limiting elements configured to limit rotation of the rotational components to within a desired range.

4. The direct drive brushless motor of claim 1 wherein the plurality of non-rotational components further includes a motor housing surrounding the plurality of outer magnets.

5. The direct drive brushless motor of claim 1 wherein the plurality of inner magnets are arranged as a first Halbach cylinder.

6. The direct drive brushless motor of claim 5 wherein the plurality of outer magnets are arranged as a second Halbach cylinder and wherein the plurality of coils are interposed between the plurality of inner magnets and the plurality of outer magnets.

7. The direct drive brushless motor of claim 5 wherein the plurality of non-rotational components further includes a cylindrical sleeve surrounded by a steel core wherein the cylindrical sleeve is dimensioned to circumscribe the center rotation shaft.

8. The direct drive brushless motor of claim 7 wherein the plurality of inner magnets surround the steel core.

9. The direct drive brushless motor of claim 1 wherein the plurality of coils are arranged to form an annular structure.

10. The direct drive brushless motor of claim 9 further including a back plate configured with a plurality of circular channels wherein at least one of the plurality of circular channels receives the annular structure.

11. A direct drive brushless motor, comprising:
a plurality of outer magnets arranged as a first Halbach cylinder;
a coil assembly including a plurality of rectangular coils surrounded by the plurality of outer magnets wherein the coil assembly is disposed to rotate relative to the plurality of outer magnets;
a coil termination plate configured to support the plurality of coils,
a flex cable having a first end and a second end, the flex cable including a plurality of electrically conductive wires for providing electrical current to one or more of the plurality of coils without the use of brushes;
a first electrical connector coupled to the coil termination plate wherein the first electrical connector is attached to the plurality of electrically conductive wires at the first end of the flex cable and to one or more of the plurality of coils;
a plurality of inner magnets arranged as a second Halbach cylinder and surrounded by the plurality of coils;
a core element surrounded by the plurality of inner magnets;
a center rotation shaft positioned within an interior space circumscribed by the core element;
a first electrical connector attached to the set of electrically conductive wires at the first end of the flex cable and to one or more of the plurality of coils; and
a second electrical connector connected to the set of electrically conductive wires at the second end of the flex cable, the second electrical connector being attached to a base surface.

12. The direct drive brushless motor of claim 11 further comprising:
a motor housing wherein the plurality of outer magnets are secured to an inner surface of the motor housing; and
a dual magnetic circuit wherein the dual magnetic circuit includes an outer circuit and an inner circuit, the outer circuit including at least the motor housing, the plurality of outer magnets and the plurality of coils and the inner circuit including at least the plurality of coils and the center rotation shaft.

13. The direct drive brushless motor of claim 12 further including a flex cable for providing the external source of current wherein at least a portion of the flex cable is enclosed by the motor housing.

14. The direct drive brushless motor of claim 11 further including a coil termination plate configured to support the plurality of coils, the flex cable being mechanically coupled to the coil termination plate.

15. The direct drive brushless motor of claim 14 further including an electrical connector attached to the coil termination plate and to one or more leads of the flex cable.

16. The direct drive brushless motor of claim 11 further including a cylindrical sleeve surrounded by the core element wherein the cylindrical sleeve is dimensioned to circumscribe the center rotation shaft.

17. The direct drive brushless motor of claim 11 wherein the plurality of coils are arranged to form an annular structure.

18. The direct drive brushless motor of claim 17 further including a back plate configured with a plurality of circular channels wherein at least one of the plurality of circular channels receives the annular structure.

19. The direct drive brushless motor of claim 11 further including:
a coil termination plate configured to support the plurality of coils wherein the coil termination plate rotates during operation of the direct drive brushless motor;
an electrical connector coupled to the coil termination plate, the electrical connector being electrically connected to one or more of the plurality of coils; and
a flex cable having one or more leads electrically connected to the electrical connector.

20. The direct drive brushless motor of claim 11 further including one or more rotation-limiting elements configured to limit rotation of the coil assembly to within a desired range.

21. A direct drive brushless motor, comprising:
a plurality of rotational components including a center rotation shaft circumscribed by a plurality of coils and a coil termination plate configured to support the plurality of coils;
a plurality of non-rotational components including a plurality of inner magnets and a plurality of outer magnets wherein the plurality of outer magnets are positioned around the plurality of coils;

a flex cable having one or more leads for providing electrical current to one or more of the plurality of coils without the use of brushes, wherein the flex cable includes a first end, a second end and an annular portion between the first end and the second end, and a set of electrically conductive wires;

a dual magnetic circuit formed from ones of the plurality rotational components and ones of the plurality non-rotational components, the dual magnetic circuit including an outer circuit and an inner circuit wherein the outer circuit includes at least the plurality of outer magnets and the plurality of coils and wherein the inner circuit includes at least the plurality of coils and the plurality of inner magnets;

an electrical connector coupled to the coil termination plate wherein the electrical connector is attached to the one or more leads of the flex cable and to one or more of the plurality of coils, wherein the electrical connector comprises a first electrical connector;

a second electrical connector connected to the set of electrically conductive wires at the second end of the flex cable, the second electrical connector being attached to a base surface; and a controller configured to drive the plurality of coils through sinusoidal commutation using a direct-quadrature control process such that each coil phase is energized by a continuous sinusoidal current included in the electrical current, the controller being responsive to at least a first current flowing in a first of the plurality of coils, a second current flowing in a second of the plurality of coils and an angular position of one of the plurality of rotational components.

\* \* \* \* \*